United States Patent
Roberge

(10) Patent No.: US 10,513,939 B2
(45) Date of Patent: Dec. 24, 2019

(54) SEAL INTERFACE WITH A DEFLECTION CONTROL FEATURE

(71) Applicant: United Technologies Corporation, Farmington, CT (US)

(72) Inventor: Gary D. Roberge, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 55 days.

(21) Appl. No.: 15/703,164

(22) Filed: Sep. 13, 2017

(65) Prior Publication Data

US 2019/0078453 A1 Mar. 14, 2019

(51) Int. Cl.
| | |
|---|---|
| *F01D 11/00* | (2006.01) |
| *F02C 7/28* | (2006.01) |
| *F16J 15/08* | (2006.01) |
| *F02K 1/80* | (2006.01) |
| *F02K 3/077* | (2006.01) |
| *F01D 25/30* | (2006.01) |

(52) U.S. Cl.
CPC .......... *F01D 11/003* (2013.01); *F01D 11/005* (2013.01); *F02C 7/28* (2013.01); *F02K 1/805* (2013.01); *F02K 3/077* (2013.01); *F16J 15/0887* (2013.01); *F01D 25/30* (2013.01); *F05D 2240/35* (2013.01); *F05D 2240/55* (2013.01); *F05D 2240/57* (2013.01); *F05D 2250/61* (2013.01); *F05D 2300/175* (2013.01)

(58) Field of Classification Search
CPC ...... F01D 11/005; F01D 25/246; F01D 25/24; F01D 11/08; F01D 11/025; F05D 2220/32; F05D 2240/55; F05D 2220/323
See application file for complete search history.

(56) References Cited

U.S. PATENT DOCUMENTS

| | | | |
|---|---|---|---|
| 6,079,945 A | 6/2000 | Wolfe et al. | |
| 9,670,791 B2* | 6/2017 | Broomer | F01D 11/005 |
| 2005/0005607 A1 | 1/2005 | Lapergue et al. | |
| 2010/0301596 A1 | 12/2010 | Amann et al. | |
| 2012/0104747 A1 | 5/2012 | Ruberte et al. | |
| 2014/0286763 A1* | 9/2014 | Munshi | F02C 7/12 415/178 |
| 2015/0315925 A1* | 11/2015 | Budnick | F02C 7/28 415/214.1 |
| 2015/0330241 A1* | 11/2015 | Chuong | F01D 11/001 415/173.1 |
| 2015/0354384 A1 | 12/2015 | Budnick | |
| 2017/0081968 A1* | 3/2017 | Fitzpatrick | F01D 9/041 |
| 2017/0138372 A1* | 5/2017 | Subramanian | F01D 5/187 |

OTHER PUBLICATIONS

EPO Search Report dated Mar. 14, 2019 for Application No. 18182752.8.

* cited by examiner

*Primary Examiner* — Long T Tran
(74) *Attorney, Agent, or Firm* — O'Shea Getz P.C.

(57) ABSTRACT

Aspects of the disclosure are directed an engine having a central longitudinal axis, comprising: a first case that at least partially defines a first flow path, a second case located radially outward of the first case, where the second case and the first case at least partially define a second flowpath, and an assembly that includes a first duct wall, a second duct wall, a finger seal disposed in a gap defined between the first duct wall and the second duct wall such that a first flow in the first flow path is isolated from a second flow in the second flowpath, a stop that projects from the first duct wall towards the second duct wall, and a diaphragm coupled to the second duct wall.

18 Claims, 6 Drawing Sheets

SEAL INTERFACE WITH A DEFLECTION CONTROL FEATURE

This invention was made with government support under contract number FA8626-16-C-2139 awarded by the United States Air Force. The government has certain rights in the invention.

BACKGROUND

Gas turbine engines, such as those which power aircraft and industrial equipment, employ a compressor to compress air that is drawn into the engine and a turbine to capture energy associated with the combustion of a fuel-air mixture. Duct and/or liner interfaces for engine components (including exhaust systems and nacelles) often require sealing between components. Seals are used in engines to isolate a fluid from one or more areas/regions of the engine. For example, seals control various parameters (e.g., temperature, pressure) within the engine and ensure proper/efficient engine operation and stability.

It can be difficult to provide adequate sealing over the operational range of an engine due to a variety of factors. Such factors include irregular/odd-shaped component profiles, component tolerances, nominal/normal component deflections (e.g., relative motion between components), and large magnitude deflections (e.g., deflections resulting from increased/maximum maneuvers).

A metallic finger seal that includes overlapping sheet metal segments is a known technique that is used for sealing. For example, U.S. patent application publication No. 2015/0354384 (hereinafter the '384 publication) describes/illustrates embodiments of an engine incorporating a finger seal. The contents of the '384 publication are incorporated herein by reference.

A finger seal may be designed for a normal range of motion within a range of acceptable elastic strain. Under excessive deflection (e.g., deflection exceeding a threshold), the seal may be crushed or deflected to the point where permanent plastic deformation occurs. This deformation results in loss of subsequent sealing capability/effectiveness.

To accommodate a larger range of motion/deflection, a packaging geometry of the seal may be increased. However, physical space might not be available in an engine to accommodate a large seal (or, analogously, including such a large seal comes with a cost in the form of space that is sacrificed/used in the engine to accommodate the seal). This may be particularly true in the context of existing/legacy engine hardware/platforms, where there might not be an opportunity to include a large seal due to existing constraints.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to an assembly, comprising: a first duct wall, a second duct wall, a seal disposed in a gap defined between the first duct wall and the second duct wall, a stop that projects from the first duct wall towards the second duct wall, and a diaphragm coupled to the second duct wall. In some embodiments, the seal is a finger seal. In some embodiments, the assembly is for an engine having a central longitudinal axis, and a portion of the first duct wall and a portion of the second duct wall axially overlap with one another, and the seal is disposed in the gap in a region of the overlap. In some embodiments, the first duct wall includes a first lead-in section, and the second duct wall includes a second lead-in section. In some embodiments, the first lead-in section and the second lead-in section are conically shaped. In some embodiments, the seal accommodates a first range of relative deflection between the first duct wall and the second duct wall. In some embodiments, the first range of relative deflection is defined by a threshold. In some embodiments, the threshold coincides with the stop contacting the second duct wall. In some embodiments, the diaphragm accommodates a relative deflection between the first duct wall and the second duct wall in an amount that is greater than the threshold. In some embodiments, the assembly is included in an engine of an aircraft, and the first range of relative deflection is associated with take-off, landing, and cruise operations of the aircraft.

Aspects of the disclosure are directed to an engine having a central longitudinal axis, comprising: a first case that at least partially defines a first flow path, a second case located radially outward of the first case, where the second case and the first case at least partially define a second flowpath, and an assembly that includes a first duct wall, a second duct wall, a finger seal disposed in a gap defined between the first duct wall and the second duct wall such that a first flow in the first flow path is isolated from a second flow in the second flowpath, a stop that projects from the first duct wall towards the second duct wall, and a diaphragm coupled to the second duct wall. In some embodiments, the engine includes a turbine exhaust section, and the assembly is located in the turbine exhaust section. In some embodiments, the engine comprises a third case located radially inward of the first case, where the third case at least partially defines a third flow path. In some embodiments, the engine comprises a third case located radially outward of the second case, where the third case and the second case at least partially define a third flow path.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

Figure 1:
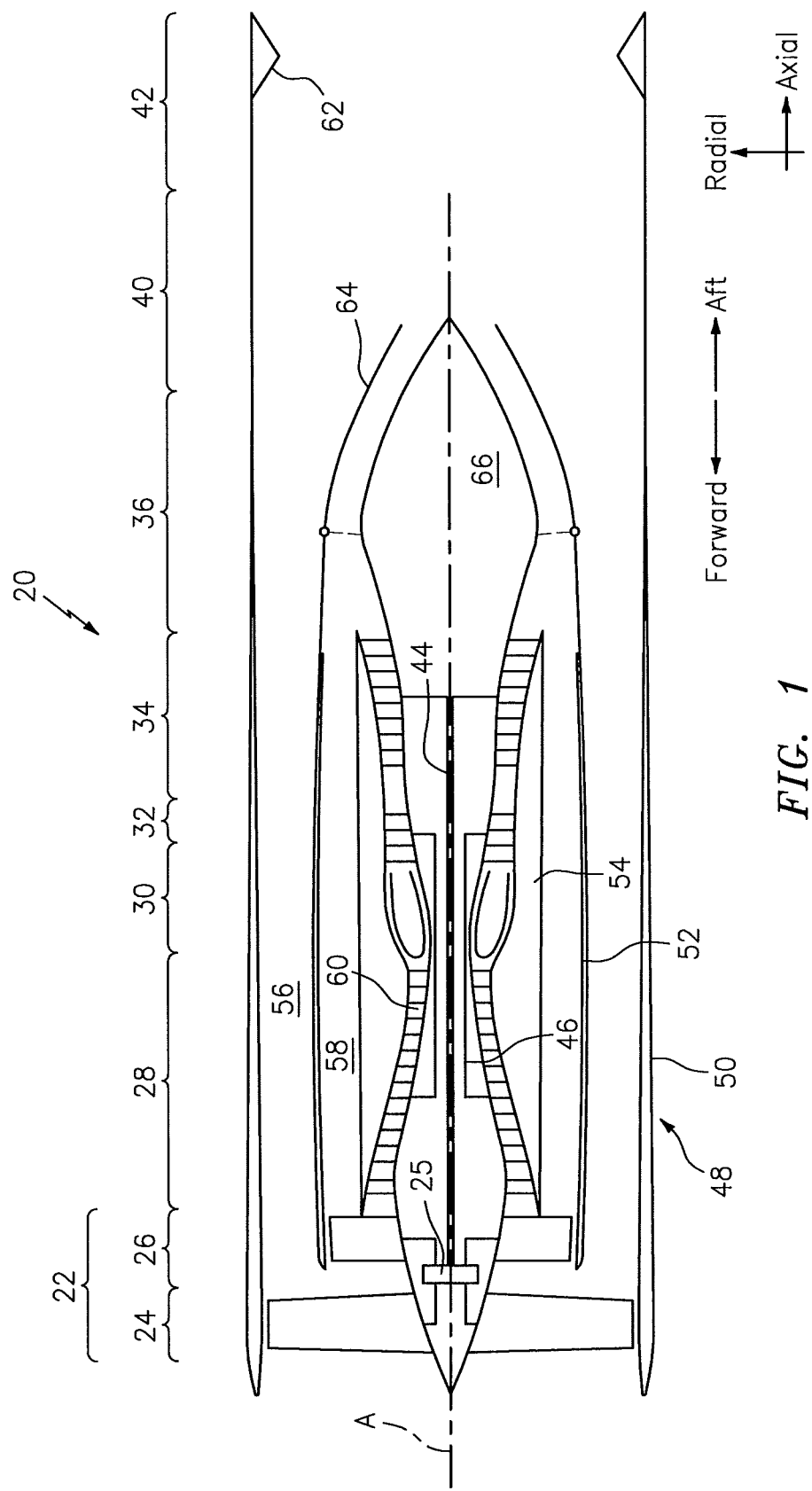
FIG. 1 is a schematic view of an exemplary gas turbine engine in accordance with aspects of this disclosure.

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure may be applied in connection with a gas turbine engine. FIG. 1 schematically illustrates an exemplary embodiment of a gas turbine engine 20. The gas turbine engine 20 may be an adaptive cycle two-spool bypass turbofan that may include: a fan section 22 with a first fan section 24 and a second fan section 26; a high pressure compressor section 28; a combustor section 30; a high pressure turbine section 32; a low pressure turbine section 34; an exhaust duct section 36; an augmentor section 40 and a nozzle section 42. Additional sections, systems and features such as a geared architecture 25 may be located in various engine sections, for example, between the fan sections 24, 26 or aft of the low pressure turbine section 34. The sections are defined along a central longitudinal engine axis A about which a low spool 44 and a high spool 46 rotate relative to an engine case structure 48. Although a particular architecture is disclosed, it should be appreciated that other architectures, such as direct-drive ungeared turbofans including three-spool architectures, will also benefit herefrom.

The engine case structure 48 may include an outer case structure 50, an intermediate case structure 52 and an inner case structure 54. The inner case structure 54 may be defined as a distinct duct as shown or defined by an outer surface of cases of the high pressure compressor 28, combustor 30, and turbines 32 and 34. It should be appreciated that various integral or assembled structures, may form the case structure 48 to essentially define an exoskeleton that supports the spools 44, 46 for rotation therein. A third stream flow path 56 may be defined by the outer case structure 50 and the intermediate case structure 52. A second stream flow path 58 may be defined by the intermediate case structure 52 and the inner case structure 54. A core flow path 60 may be defined by the inner case structure 54 and/or one or more walls of the high pressure compressor 28 and components (e.g., the combustor 30, the turbines 32 and 34, etc.) downstream/aft of the compressor 28. The second stream flow path 58 may be defined radially inward of the third stream flow path 56 and the core flow path 60 may be radially inward of the second stream flow path 58.

The first fan section 24 may communicate the bypass flow stream into a third stream flow path 56, a second stream flow path 58 and a first or primary core flow path 60 that is in communication with the combustor section 30. The second fan section 26 may communicate a second flow stream into the second stream flow path 58 and the core flow path 60. The second fan section 26 may be radially inboard and downstream of the first fan section 24 such that some or all flow from the second fan section 26 is communicated into the second stream flow path 58 and the core flow path 60. The fan section 22 may alternatively or additionally include other architectures that, for example, include additional or fewer sections each with or without various combinations of adaptive or fixed guide vanes.

The first fan section 24 and the second fan section 26 may direct airflow into the core flow path 60 such that the core flow stream is further compressed by the high pressure compressor section 28, mixed and burned with fuel in the combustor section 30, then expanded over the turbine sections 32, 34 to rotationally drive the respective high spool 46 and low spool 44 in response to the expansion. The core flow path 60 may alternatively or additionally include other architectures that, for example, include additional or fewer sections and or stages each with or without various combinations of variable or fixed guide vanes.

Downstream of the turbine sections 32, 34, the exhaust duct section 36 may be circular in cross-section as typical of an axis-symmetric augmented low bypass turbofan or may include non-axisymmetric cross-section segments. In addition to the various cross-sections, the exhaust duct section 36 may be non-linear with respect to the central longitudinal engine axis A. Furthermore, in addition to the various cross-sections and the various longitudinal shapes, the exhaust duct section 36 may terminate in the nozzle section 42.

The nozzle section 42 may include a variable flow area exhaust nozzle 62 at the end of the outer case structure 50 that receives flow from the third stream flow path 56, the second stream flow path 58 and the core flow path 60 such as within an embedded engine architecture. Alternatively flow through the third stream flow path 56 may be discharged through a separate, independent nozzle from that is used to discharge flow through the core flow path 60 and the second stream flowpath 58. It should be understood that various fixed, variable area, convergent/divergent, two-dimensional and three-dimensional nozzle systems may be utilized herewith. Alternatively, a variable exhaust nozzle 64 at the end of the intermediate case structure 52 that receives the second flow from the second stream flow path 58 and the core flow path 60 may be provided for a podded engine architecture. Alternatively or in addition thereto, a tailcone 66 may be selectively translated along axis A to further modulate the flow from the second stream flow path 58 and the core flow path 60.

FIG. 1 represents one possible configuration for an engine 20. Aspects of the disclosure may be applied in connection with other environments, including additional configurations for gas turbine engines. For example, aspects of the disclosure may be applied in connection with non-geared engines.

Figure 2:
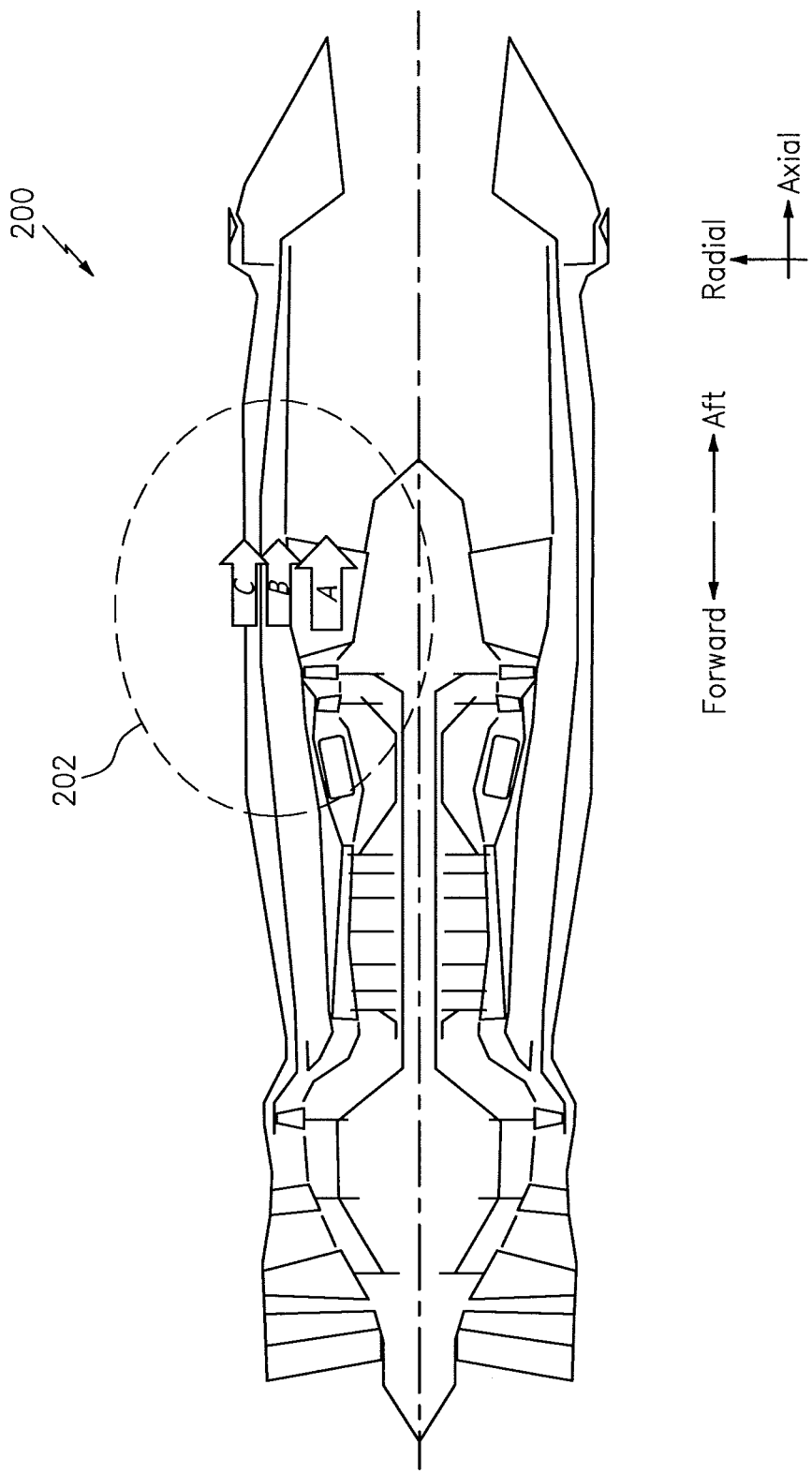
FIG. 2 illustrates a schematic view of an engine incorporating three flows in accordance with aspects of this disclosure.

Referring to FIG. 2, a cross-section of an engine 200 is shown. The engine 200 may correspond to the engine 20 of FIG. 1. The engine 200 is shown with a gas generator/primary flow 'A', a fan discharge bypass flow 'B', and an intermediate fan bypass flow 'C'. In some embodiments, the primary flow 'A' may correspond to a flow through at least a portion of the core flow path 60 of FIG. 1. In some embodiments, the bypass flow 'B' may correspond to a flow through at least a portion of the second stream flow path 58 of FIG. 1. In some embodiments, the intermediate fan bypass flow may correspond to a flow through at least a portion of the third stream flow path 56 of FIG. 1.

Figure 3:
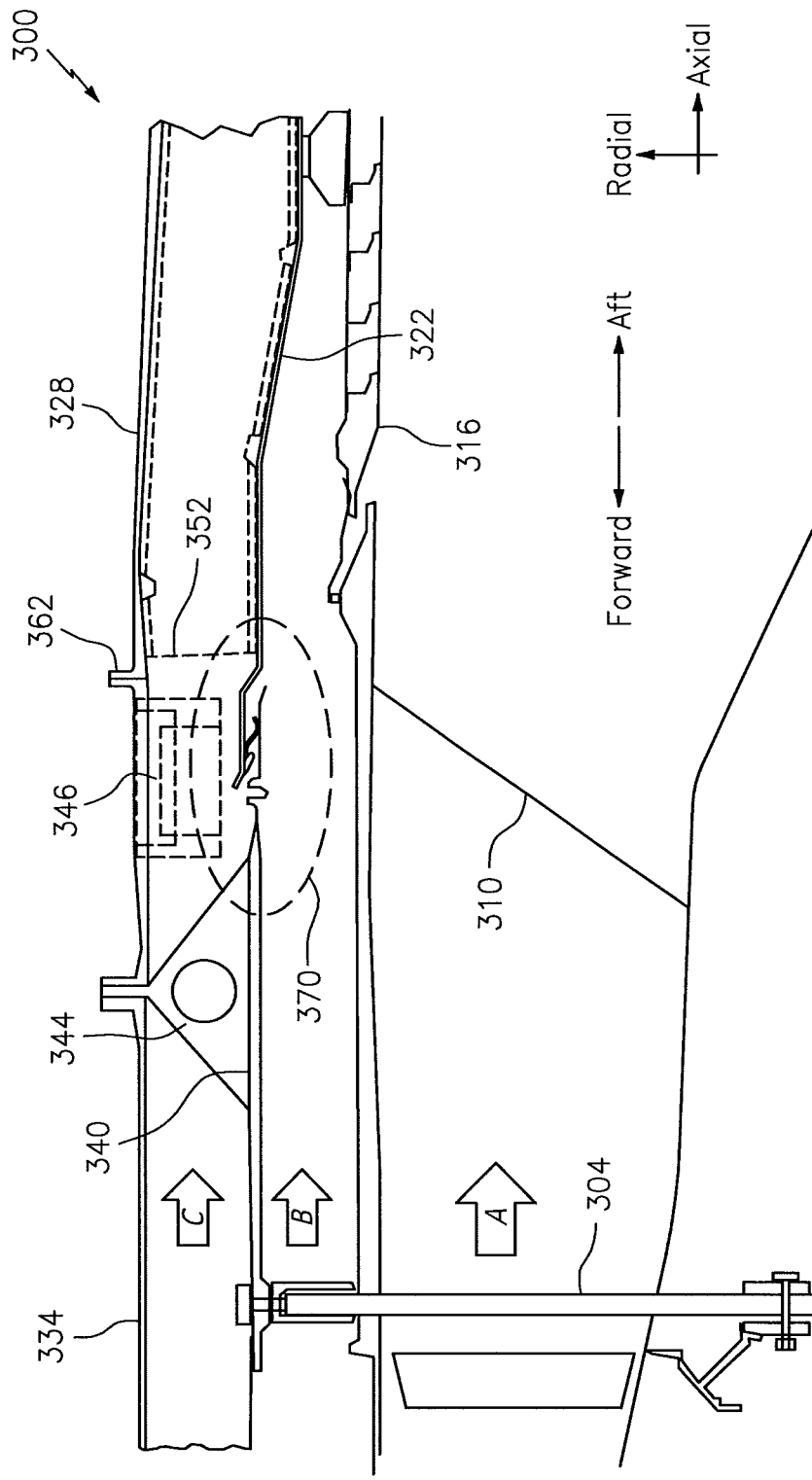
FIG. 3 illustrates a turbine exhaust section of an engine in accordance with aspects of this disclosure.

A closer view of a portion of the engine 200 denoted by/contained within the dashed circle 202 of FIG. 2, which portion 202 includes various components of a turbine exhaust section of the engine 200, is shown in FIG. 3.

Referring to FIG. 3, a turbine exhaust section 300 of an engine is shown. The turbine exhaust section 300 may include various components, such as for example a tierod 304, a turbine exhaust case 310, an augmentor liner 316, an aft inner augmentor duct wall 322, an aft outer augmentor duct wall 328, a fan duct wall 334, a forward augmentor duct wall 340, one or more engine thrust mounts 346, and shear ties 352. In some embodiments, a flange 362 aft of the engine thrust mount 346 may provide a connection (e.g., a bolted connection) to the aft outer duct wall 328.

The tierod 304 may be made of one or more materials, such as for example a metal or metal alloy. In some embodiments, the tierod 304 may be formed from nickel or titanium. The tierod 304 may transfer loads from a bearing compartment (not shown), to the forward augmentor duct wall 340. The load may then be transferred from the forward augmentor duct wall 340 to (a truss/flange 344 of the forward augmentor duct wall 340, and then to) the engine thrust mount 346. Alternatively, the tierod 304 may also connect to a duct radially outward from the forward augmentor wall 340 including fan duct wall 334 or adjacent structures. The number/count of tierods 304 that are used may be based on loads that may be present over the operational range of the engine. Between four and sixteen tierods 304 may be used in some embodiments.

The turbine exhaust case 310, which may be located axially aft of the turbine section of the engine (e.g., turbine section 34 of FIG. 1), may be used to contain the gases exhausted by the turbine section (where those gases may be represented by the flow 'A' shown in FIG. 3). The turbine exhaust case 310 may include one or more aerodynamically-shaped vanes that may facilitate conveying/exhausting the gases. In some embodiments, the turbine exhaust case 310 may include oil, fuel, or air lines/channels, or combinations thereof, such as for example supply and/or drain lines.

The augmentor liner 316 may be made of one or more materials, such as for example nickel or cobalt based alloys alloy. In some embodiments, the augmentor liner 316 may be fabricated from non-metallic materials or as a hybrid structure that includes metallic and non-metallic materials. The augmentor liner 316 may be coupled to the turbine exhaust case 310 and may facilitate continued conveyance/exhaustion of the gases.

The aft inner augmentor duct wall 322 and the aft outer augmentor duct wall 328 each may be made of one or more materials, such as for example nickel or titanium. The walls 322 and 328 may be used to contain the flow 'C' shown in FIG. 3. Furthermore, the walls 322 and 328 may provide structural support for an exhaust nozzle/nozzle section (e.g., nozzle section 42 of FIG. 1) and may transfer loads from the nozzle section to the engine thrust mount 346. These loads maybe a combination of axial, radial, bending moment and shear loads carried through duct walls 322 and 328.

The fan duct wall 334 may correspond to the (radially) outermost portion of the engine casing. Fan duct wall 334 may be fabricated from metallic materials (titanium as an example), or from non-metallic materials including organic matrix composites. The fan duct wall 334 may be coupled to the forward augmentor duct wall 340 at the truss/flange 344 of the forward augmentor duct wall 340.

The forward augmentor duct wall 340, which may be coupled to the tierod 304 as shown, may be used to contain the flow 'C' shown in FIG. 3. The forward augmentor duct wall 340 may be made of one or more materials, such as for example nickel or titanium.

The engine thrust mount 346 may be made of one or more materials, such as for example titanium or composite. The thrust mount 346 may serve as a receptacle for one or more pins and may couple the engine to one or more structures (e.g., a frame of an aircraft). The thrust mount 346 may serve as a ground/reference for receiving loads (e.g., thrust loads) of the engine or supporting the engine during assembly and transport.

The shear ties 352 may be made of one or more materials. For example, the shear ties 352 may include sheet metal formed from titanium and nickel based alloys. The shear ties 352 may transfer loads (e.g., loads associated with the aft inner augmentor duct wall 322) to the engine thrust mount 346 via the aft outer augmentor duct wall 328.

Figure 4:
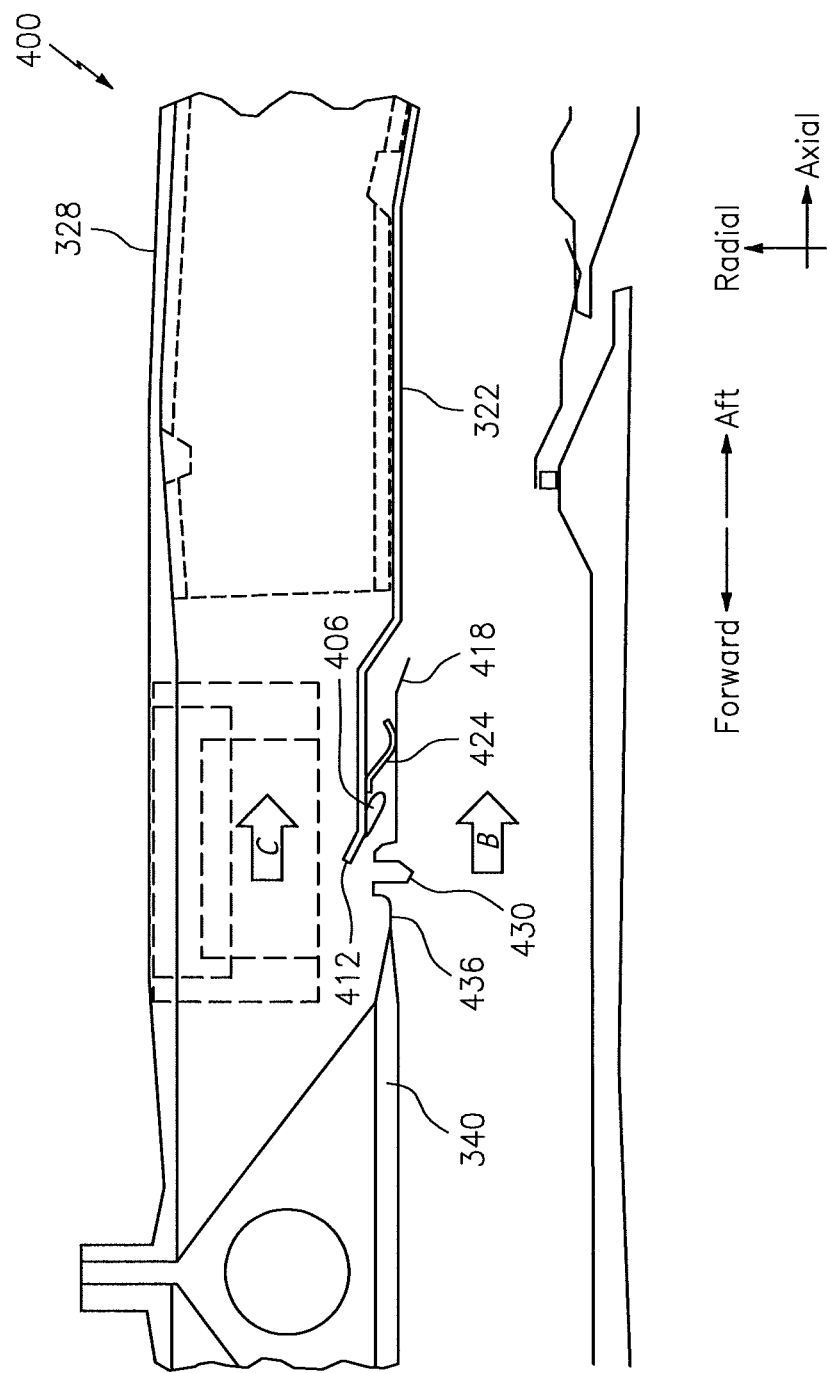
FIG. 4 illustrates an assembly incorporating a portion of the turbine exhaust section of FIG. 3 in accordance with aspects of this disclosure.

A portion of the turbine exhaust section 300 denoted by/contained within the dashed circle 370 of FIG. 3, which portion 370 includes various components that may be used as a seal assembly/arrangement (between, e.g., the forward augmentor duct wall 340 and the rear inner augmentor duct wall 322) is shown in FIG. 4. In some embodiments, assembly of a nozzle module takes place as the assembly is moved, e.g., forward relative to an assembled engine including the fan duct wall 334, truss 344 and engine thrust mount 346 and fastened at the flange 362 described above. This assembly may include a seal interface at location 370.

Referring to FIG. 4, an assembly 400 is shown. The assembly 400 may include one or more features, such as for example a ramp/stop 406, a first lead-in section 412, a second lead-in section 418, a finger seal 424, a diaphragm 430, and a sheet extension 436.

The first lead-in section 412 may be coupled to, or may be included as a portion of, the aft inner augmentor duct wall 322. The second lead-in section 418 may be coupled to, or may be included as a portion of, the forward augmentor duct wall 340.

The sections 412 and 418 are referred to as "lead-in" sections insofar as during assembly they may represent the portion of their respective duct walls that first come into contact with, or in proximity to, the other of the duct walls. As the perimeter (axisymmetric or asymmetric in shape) of sections 412 and 418 become proximate with relative axial motion during the assembly process, the geometry of the "lead-in" helps to facilitate duct and seal radial positioning.

The first lead-in section 412 and the second lead-in section 418 may be formed as/include one or more shapes, such as a conical shape. For example, the first and second lead-in sections 412/418 may project in both the radial and axial reference directions as shown in FIG. 4, and may be fully circumferential in order to provide for a conical shape. For interfaces that are non-axisymmetric, the lead-in sections 412 and 418 assist in nesting during assembly to ensure proper radial orientation of adjacent and overlapping ducts including attached finger seals (e.g., finger seal 424). The conical shape of the first lead-in section 412 and the second lead-in section 418 may be used to facilitate installation of the various components shown in FIG. 4. For example, during installation there may be a (radial) offset between the forward augmentor duct wall 340 and the aft inner augmentor duct wall 322 relative to what is shown in FIG. 4. The conical shape may provide for a self-centering feature by smoothly allowing for an adjustment (e.g., elimination) of that offset. If the finger seal 424 is installed in a right-to-left/aft-to-forward manner in relation to FIG. 4, the second lead-in section 418 may help to smoothly guide the finger seal 424 into the position shown in FIG. 4 by incrementally causing the finger seal 424 to compress as it is being positioned.

As shown in FIG. 4, the first lead-in section 412 may be located axially forward of the second lead-in section 418 in a final, assembled state. As shown in FIG. 4, the first lead-in section 412 may be located radially outward/outboard of the second lead-in section 418.

The finger seal 424 may be disposed between the forward augmentor duct wall 340 and the aft inner augmentor duct wall 322. For example, the finger seal 424 may be disposed in a radial gap that is defined/located between the forward augmentor duct wall 340 and the aft inner augmentor duct wall 322. The finger seal 424 may be disposed in a region where the forward augmentor duct wall 340 and the aft inner augmentor duct wall 322 axially overlap with one another as shown in FIG. 4. The finger seal 424 may be attached (e.g., riveted) to the aft inner augmentor duct wall 322.

The finger seal 424, which may be formed from overlapping multi-ply sheet metal segments with ply thickness of, e.g., 0.005 inches to 0.040 inches (approximately 100 micrometers to 1 millimeter), may be used to accommodate nominal/normal deflections between the forward augmentor duct wall 340 and the aft inner augmentor duct wall 322 as described further below. The material used in construction of the finger seal 424 is a known art, and may be a metallic alloy (e.g., Inconel 718) with strength adequate to resist permanent plastic deformation during seal compression. Each overlapping segment may include features to enable compliance via local deflection of each "finger". These features include slots formed into each segment with the features in each ply element staggered or offset to preclude excessive leakage. The finger seal 424 may isolate (e.g., fluidly isolate) the flow 'B' and the flow 'C'. For example, the flow 'B' may be at a higher pressure than the flow 'C', such that if the seal 424 was not present there may be a tendency for the flow 'B' to flow into the flowpath associated with the flow 'C'.

The stop 406 may be coupled to, or included as part of, the aft inner augmentor duct wall 322. The stop 406 may be located proximate to the first lead-in section 412. The stop 406 may be located aft of the first lead-in section 412. The stop 406 may be included/formed using one or more machining operations relative to, e.g., the aft inner augmentor duct wall 322.

The stop 406 may project from the aft inner augmentor duct wall 322. In some embodiments, the stop 406 may project from the first lead-in section 412. In some embodiments, the stop 406 may project radially outward from duct wall 340. The stop 406 may project axially aft and/or radially inward/inboard relative to the first lead-in section 412.

The stop 406 may be a full-hoop/full-ring structure. The stop 406 may be an interrupted/segmented structure, with each segment consuming a portion of the overall circumference or perimeter of the stop 406.

The stop 406 may be used as a guide during the construction of the assembly 400. This may be helpful in the event that visibility during construction is impaired or even completely obscured (e.g., where impaired/obscured visibility in this context may be referred to as a so-called "blind assembly procedure"). The stop 406 may help to maintain shape (e.g., roundness). For example, the stop 406 may add stiffness/rigidity to the aft inner augmentor duct wall 322. The stop 406, potentially in conjunction with the diaphragm 430, may serve to control (e.g., limit) a deflection (e.g., a radial deflection) of the finger seal 424 as described further below.

The diaphragm 430 may be coupled to the forward augmentor duct wall 340. The diaphragm 430 may be formed integrally with the forward augmentor duct wall 340. In some embodiments, the diaphragm 430 may be coupled to the forward augmentor duct wall 340 via the sheet extension 436. In some embodiments, the sheet extension 436 may be riveted or welded to the forward augmentor duct wall 340. The sheet extension 436 may be relatively thin; for example, the sheet extension may be approximately 0.040 inches (approximately 1 millimeter) thick in some embodiments.

The diaphragm 430 may accommodate large deflections (e.g., deflections greater than a threshold) as described further below. The diaphragm 430 may include a number of ripples/undulations to facilitate local radial flexure. For example, the diaphragm 430 is shown as having two ripples/undulations in FIG. 4. The particular count of ripples/undulations (as well as their dimension [e.g., radial height]) may be a function of the load/deflection that the diaphragm 430 is required to accommodate. Diaphragm material (e.g.—Inconel 718) may be selected to provide desired deflection under a condition larger than a threshold without permanent or plastic deformation.

Figure 5:
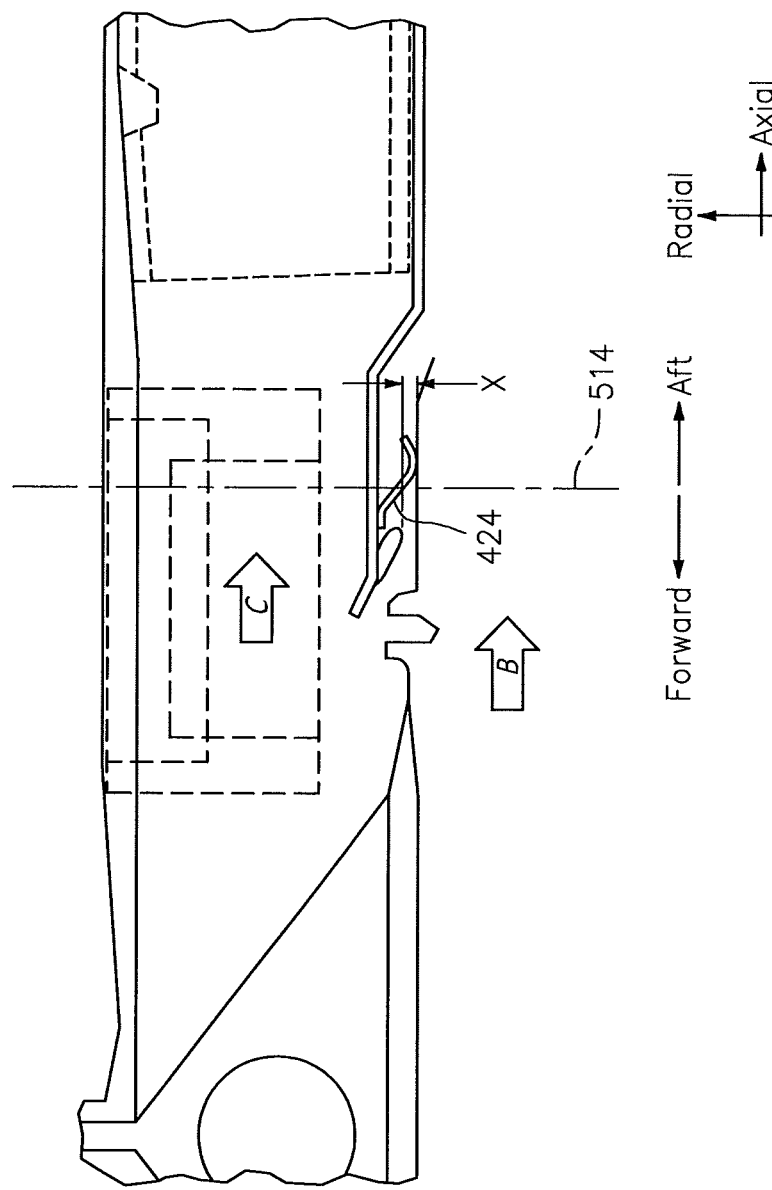
FIG. 5 illustrates a nominal range of deflection associated with the assembly of FIG. 4.

During nominal/normal engine operating conditions, the radial gap between the forward augmentor duct wall 340 and the aft inner augmentor duct wall 322 may change within a (first) range denoted by the arrows 'X' shown in FIG. 5. This change in the radial gap, which may be due to relative component deflections (e.g., a deflection of the forward augmentor duct wall 340 relative to the aft inner augmentor duct wall 322 due to imparted loads or relative thermal growth), may be accommodated by the finger seal 424. Over the range of compression 'X', the design of the finger seal 424 may prevent permanent or plastic deformation of the finger seal 424, thereby retaining compliance and sealing effectiveness. An axis 514 is superimposed in FIG. 5. The axis 514 may be reflective of the nominal/normal engine operating conditions. The reasons for including the axis 514 will become clearer below in connection with the transient/abnormal engine operating conditions that are described.

Figure 6:
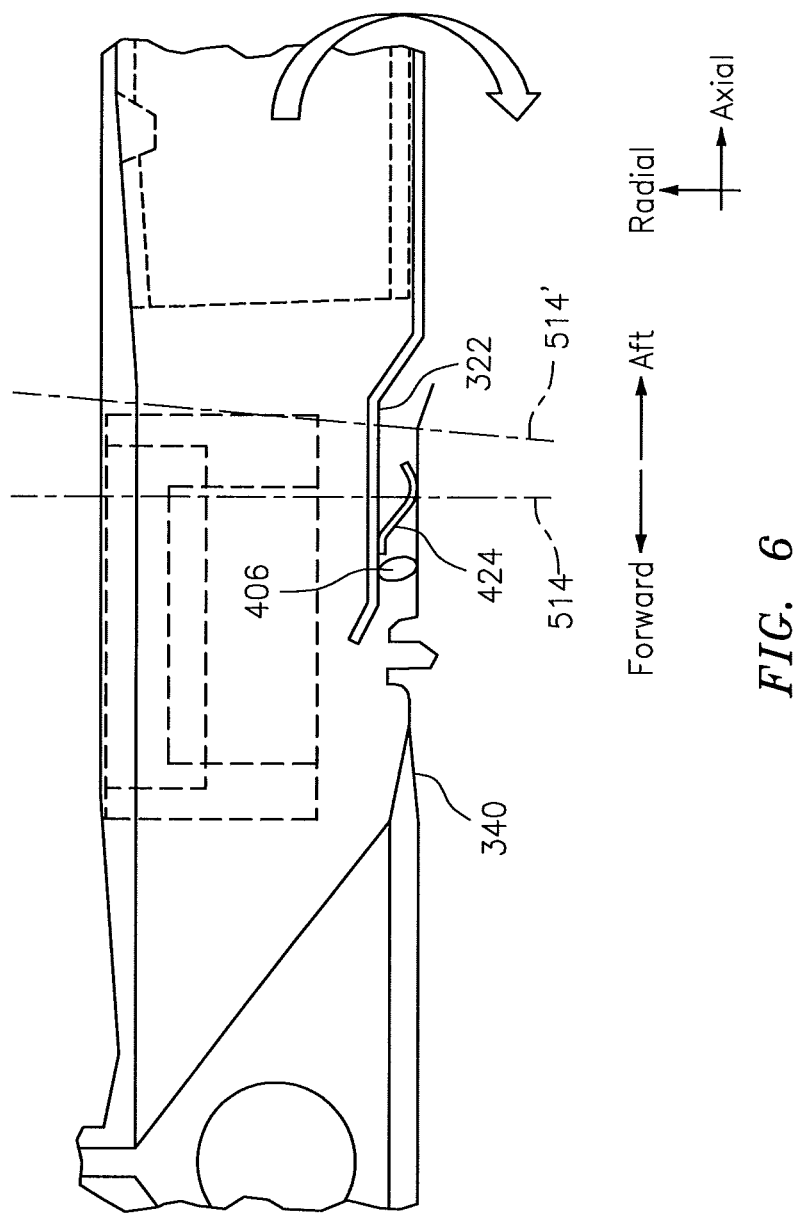
FIG. 6 illustrates the assembly of FIG. 4 when subject to a transient deflection condition.

During transient/abnormal engine operating conditions (such as for example during a maximum maneuver/limiting condition), the radial gap between the forward augmentor duct wall 340 and the aft inner augmentor duct wall 322 may close locally to zero at the stop 406 as shown in FIG. 6. In other words, and as shown in FIG. 6, the stop 406 may contact the forward augmentor duct wall 340 proximate a radially inner end/surface of the stop 406. Any additional deflection experienced by the engine hardware, e.g., relative deflection between the walls 322 and 340, beyond the range described above in connection with the nominal/normal engine operating conditions may be transferred to the forward augmentor duct wall 340. Such a transfer may result in a bending at the location of the diaphragm 430. The transfer of the load to the forward augmentor duct wall 340 is reflected by the clockwise skew of the axis 514' in FIG. 6 relative to the axis 514 of FIG. 5 (the axis 514 is carried forward from FIG. 5 to FIG. 6 for ease in comparison between the axis 514' and the axis 514). This transfer may reduce the likelihood of, or even prevent, a crushing/deformation of the finger seal 424. In this manner, adequate sealing capability may be maintained during and following the transient/abnormal engine operating conditions.

In accordance with the above, whether the engine is operating in a nominal/normal condition or a transient/abnormal condition may be defined by one or more thresholds. For example, in the context of an aircraft nominal/normal conditions may be associated with 1 to 5G operations (such as take-off, landing, cruise, etc.). In contrast, transient/abnormal conditions may be associated with 9G operations. A given threshold may be based on whether the stop 406 contacts the forward augmentor duct wall 340.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. An assembly, comprising:
   a first duct wall;
   a second duct wall;
   a seal disposed in a gap defined between the first duct wall and the second duct wall;
   a stop that projects from the first duct wall towards the second duct wall; and
   a diaphragm coupled to the second duct wall,
   wherein the stop is disposed axially between the seal and the diaphragm and wherein the second duct wall is configured to bend at the location of the diaphragm in response to a contact between the stop and the second duct wall.

2. The assembly of claim 1, wherein the seal is a finger seal.

3. The assembly of claim 1, wherein the assembly is for an engine having a central longitudinal axis, and wherein a portion of the first duct wall and a portion of the second duct wall axially overlap with one another, and wherein the seal is disposed in the gap in a region of the overlap.

4. The assembly of claim 3, wherein the first duct wall includes a first lead-in section, and wherein the second duct wall includes a second lead-in section.

5. The assembly of claim 4, wherein the first lead-in section and the second lead-in section are conically shaped.

6. The assembly of claim 5, wherein the first and second lead-in sections form terminal ends of the respective first and second duct walls and wherein the first and second lead-in sections do not axially overlap.

7. The assembly of claim 5, wherein each of the first and second lead-in sections comprise a first end and an opposing second end forming a terminal end of the first and second duct walls, respectively, and wherein the first lead in section extends from the first end to the second end in a first direction axially and radially away from the seal and the second lead-in section extends in an axially and radially opposite second direction from the first end to the second end with respect to the first direction.

8. The assembly of claim 1, wherein the seal accommodates a first range of relative deflection between the first duct wall and the second duct wall.

9. The assembly of claim 8, wherein the first range of relative deflection is defined by a threshold.

10. The assembly of claim 9, wherein the threshold coincides with the stop contacting the second duct wall.

11. The assembly of claim 9, wherein the diaphragm accommodates a relative deflection between the first duct wall and the second duct wall in an amount that is greater than the threshold.

12. The assembly of claim 8, wherein the assembly is included in an engine of an aircraft, and wherein the first range of relative deflection is associated with take-off, landing, and cruise operations of the aircraft.

13. The assembly of claim 1, wherein the diaphragm forms an integral portion of the second duct wall.

14. The assembly of claim 13, wherein the diaphragm comprises a first end and an opposite second end and the second duct wall comprises a first portion in communication with the first end of the diaphragm and a second portion in communication with the second end of the diaphragm and the seal and wherein the diaphragm is configured to bend to effect a deflection of the second portion of the second duct wall away from the first duct wall.

15. An engine having a central longitudinal axis, comprising:
   a first case that at least partially defines a first flow path;
   a second case located radially outward of the first case, where the second case and the first case at least partially define a second flowpath; and
   an assembly that includes
      a first duct wall;
      a second duct wall;
      a finger seal disposed in a gap defined between the first duct wall and the second duct wall such that a first flow in the first flow path is isolated from a second flow in the second flowpath;
      a stop that projects from the first duct wall towards the second duct wall; and
      a diaphragm coupled to the second duct wall,
      wherein the stop is disposed axially between the seal and the diaphragm and wherein the second duct wall is configured to bend at the location of the diaphragm in response to a contact between the stop and the second duct wall.

16. The engine of claim 15, wherein the engine includes a turbine exhaust section, and wherein the assembly is located in the turbine exhaust section.

17. The engine of claim 15, further comprising:
   a third case located radially inward of the first case, where the third case at least partially defines a third flow path.

18. The engine of claim 15, further comprising:
   a third case located radially outward of the second case, where the third case and the second case at least partially define a third flow path.

* * * * *